US010940452B2

(12) United States Patent
Velten et al.

(10) Patent No.: US 10,940,452 B2
(45) Date of Patent: Mar. 9, 2021

(54) AUTOMATED PAINT MACHINE WITH CUSTOM ORDER CAPABILITY

(71) Applicant: Walmart Apollo, LLC, Bentonville, AR (US)

(72) Inventors: Jeremy L. Velten, Bella Vista, AR (US); Robert Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 120 days.

(21) Appl. No.: 16/409,285

(22) Filed: May 10, 2019

(65) Prior Publication Data
US 2019/0374914 A1 Dec. 12, 2019

Related U.S. Application Data

(60) Provisional application No. 62/681,338, filed on Jun. 6, 2018.

(51) Int. Cl.
*B01F 13/10* (2006.01)
*G06Q 20/20* (2012.01)
(Continued)

(52) U.S. Cl.
CPC .......... *B01F 13/1061* (2013.01); *B44D 3/003* (2013.01); *G06Q 20/20* (2013.01); *G06Q 30/0601* (2013.01)

(58) Field of Classification Search
CPC .. G01J 3/463; G01J 3/52; B44D 3/003; B01F 3/1061; B01F 3/1063; B01F 3/1055; B01F 3/1066; G06Q 20/20
See application file for complete search history.

(56) References Cited

U.S. PATENT DOCUMENTS 5,137,367 A 8/1992 Madonia et al.
6,959,284 B1 10/2005 Howes
(Continued)

FOREIGN PATENT DOCUMENTS

WO 2008045418 A1 4/2008
WO 2009027451 A1 3/2009
WO 2016191209 A1 12/2016

OTHER PUBLICATIONS

Copenheaver, Blaine R., "International Search Report", International Application No. PCT/US2019/031788, dated Jul. 19, 2019, 2 pages.
(Continued)

Primary Examiner — Timothy R Waggoner

(57) ABSTRACT

Embodiments of a vending system are disclosed for delivering custom paints, permitting automated paint mixing and dispensing without the need for assistance. Customizable paint may be ordered locally or remotely, possibly with improved color matching that leverages color references to compare a known color with a color as observed within an image provided by the customer. Dimensional estimates of the surface to be painted may be possible using scale references within an image provided by the customer, to provide quantity suggestions. Common consumer products, having packaging of known color and dimensions, placed within the image provided by the customer may provide both color references and scale references. A preview function may replicate the image provided by the customer, but indicating the new paint color, as adjusted according to an analysis of one or more color references.

20 Claims, 12 Drawing Sheets

(51) Int. Cl.
*B44D 3/00* (2006.01)
*G06Q 30/06* (2012.01)

(56) References Cited

U.S. PATENT DOCUMENTS

| | | | |
|---|---|---|---|
| 8,666,540 B2 * | 3/2014 | Milhorn | B01F 9/0005 |
| | | | 700/239 |
| 2003/0151611 A1 * | 8/2003 | Turpin | G06Q 30/0641 |
| | | | 345/589 |
| 2003/0216972 A1 | 11/2003 | Gotou et al. | |
| 2005/0281480 A1 | 12/2005 | Baldwin | |
| 2006/0011259 A1 | 1/2006 | Parekh | |
| 2013/0235398 A1 | 9/2013 | Bhatti et al. | |
| 2014/0232923 A1 * | 8/2014 | Koh | G01J 3/0264 |
| | | | 348/333.11 |
| 2015/0235389 A1 | 8/2015 | Miller et al. | |
| 2017/0161822 A1 | 6/2017 | Crogan et al. | |
| 2018/0117550 A1 | 5/2018 | Charles et al. | |
| 2018/0146175 A1 * | 5/2018 | Mui | G01J 3/52 |
| 2018/0158124 A1 | 6/2018 | Caruso et al. | |
| 2019/0138168 A1 * | 5/2019 | Vickers | G01J 3/52 |

OTHER PUBLICATIONS

Copenheaver, Blaine R., "Written Opinion of the International Searching Authority", International Application No. PCT/US2019/031788, dated Jul. 19, 2019, 4 pages.

* cited by examiner

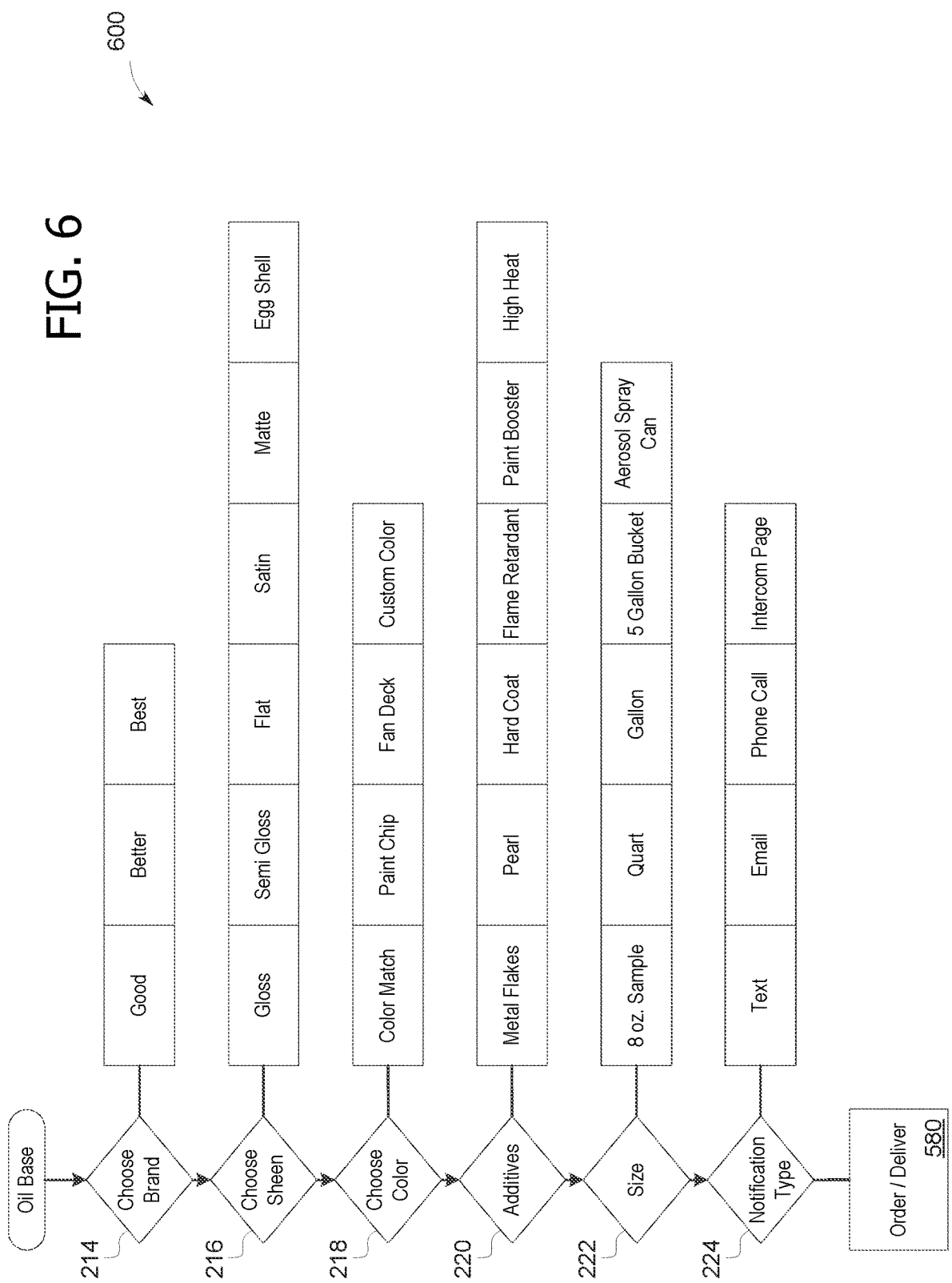

AUTOMATED PAINT MACHINE WITH CUSTOM ORDER CAPABILITY

BACKGROUND

Currently, in retail paint departments or stores, paint is selected by customers and ordered through an employee. A store employee selects the appropriate base and adds the appropriate colorants to fulfill a customer need. This is labor intensive and requires not only specific training for employees, but also the availability of a sufficient number of trained employees, for the entire time periods in which customer orders may be received. This demand, for the persistent presence of properly-trained employees in order to timely fulfill customers' orders, may place an unfavorable burden on a store—or alternatively, may lead to customer frustration if a trained employee is unavailable.

SUMMARY

Embodiments of a vending system are disclosed for delivering custom paints, permitting automated paint mixing and dispensing without the need for assistance. Customizable paint may be ordered locally or remotely, possibly with improved color matching that leverages color references to compare a known color with a color as observed within an image provided by the customer. Dimensional estimates of the surface to be painted may be possible using scale references within an image provided by the customer, to provide quantity suggestions. Common consumer products, having packaging of known color and dimensions, placed within the image provided by the customer may provide both color references and scale references. A preview function may replicate the image provided by the customer, but indicating the new paint color, as adjusted according to an analysis of one or more color references.

Some embodiments of a system for automated paint dispensing, implemented on at least one processor, may comprise: a processor; and a non-transitory computer-readable medium storing instructions that are operative when executed by the processor to: receive an image of a scene comprising a reference object; identify the reference object; determine a true color of the reference object; determine a color difference between an observed color of the reference object and the true color of the reference object; provide a preview of a finished project using a proposed paint mixture, the preview using a color adjustment based on the determined color difference; and dispense paint with additives included according to the proposed paint mixture.

Some methods for automated paint dispensing, implemented on at least one processor, may comprise: receiving an image of a scene comprising a reference object; identifying the reference object; determining a true color of the reference object; determining a color difference between an observed color of the reference object and the true color of the reference object; providing a preview of a finished project using a proposed paint mixture, the preview using a color adjustment based on the determined color difference; and dispensing paint with additives included according to the proposed paint mixture.

One or more exemplary computer storage devices having a first computer-executable instructions stored thereon for automated paint dispensing, which, on execution by a computer, may cause the computer to perform operations comprising: receiving an image of a scene comprising a reference object; identifying the reference object; determining a true color of the reference object; determining a color difference between an observed color of the reference object and the true color of the reference object; providing a preview of a finished project using a proposed paint mixture, the preview using a color adjustment based on the determined color difference; and dispensing paint with additives included according to the proposed paint mixture.

Alternatively, or in addition to the other examples described herein, examples include any combination of the following: providing a suggestion of the reference object; determining a coverage need for the proposed paint mixture using an area measurement of the surface to be painted; suggesting parameters for the proposed paint mixture; using a wizard to generate the suggested paint parameters; receiving delivery or notification preferences; and the suggested paint parameters include one or more parameters selected from the list consisting of: application, brand, sheen, color, additives, and quantity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A, 5B, and 6 are diagrams of exemplary process flows having additional detail related to FIGS. 2-4.

Corresponding reference characters indicate corresponding parts throughout the drawings.

DETAILED DESCRIPTION

Figure 1A:
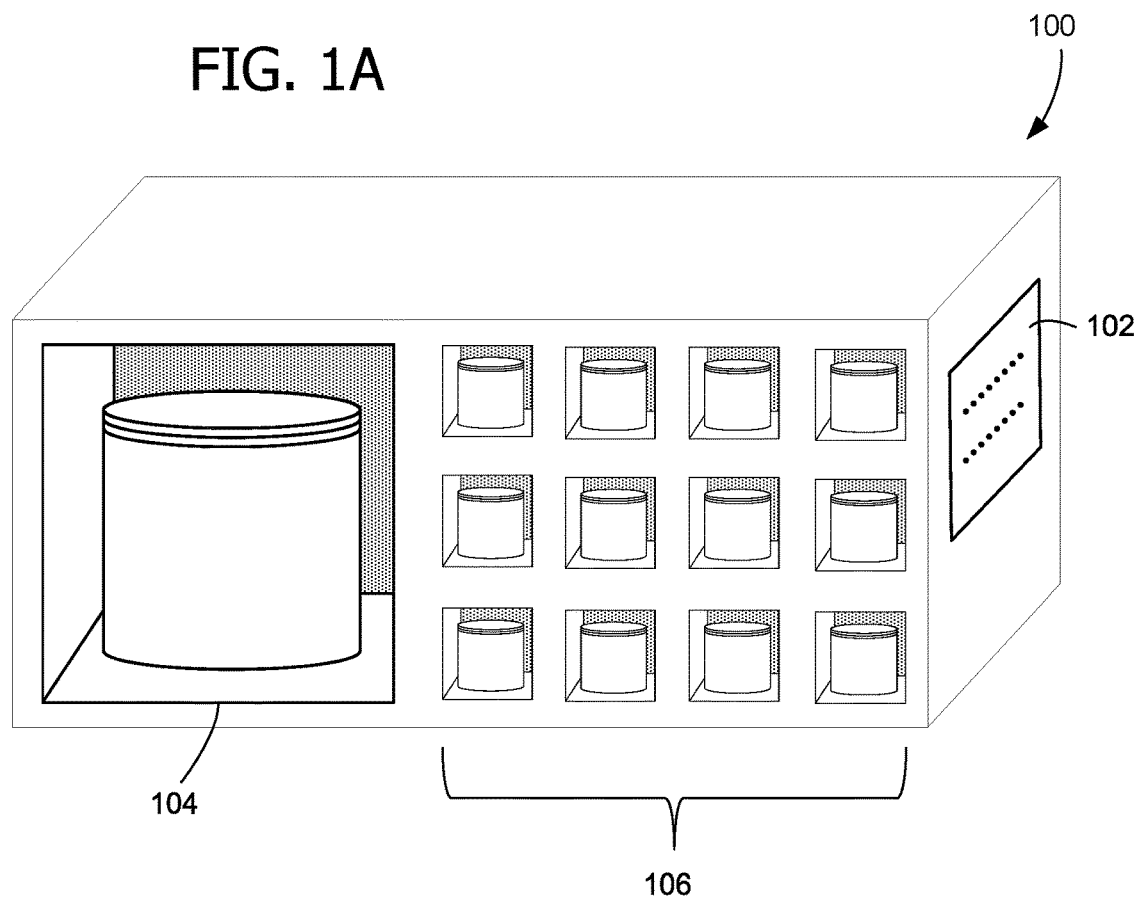
FIGS. 1A-1C illustrate an example automated paint machine with custom order capability.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

Current custom paint mixing services for customers is labor intensive A store employee selects the appropriate base and adds the appropriate colorants to fulfill a customer need. This requires not only specific training for employees, but also the availability of a sufficient number of trained employees, for the entire time periods in which customer orders may be received. This demand, for the persistent presence of properly-trained employees in order to timely fulfill customers' orders, may place an unfavorable burden on a store—or alternatively, may lead to customer frustration if a trained employee is not available.

An automated paint machine with custom order capability may alleviate these problems by enabling a customer to order paint, either on-location or remotely, while an automated system mixes and dispenses the paint according to the customer's specifications. Changes in consumer custom paint mixing service may be possible that could impact customer experiences and staffing requirements, by dispensing custom-color paint without the need for employee interaction.

Referring to the figures, examples of the disclosure describe systems and operations for permitting automated paint mixing and dispensing without the need for assistance. Customizable paint may be ordered locally or remotely, possibly with improved color matching that leverages color references to compare a known color with a color as observed within an image provided by the customer. Dimensional estimates of the surface to be painted may be possible using scale references within an image provided by the customer, to provide quantity suggestions. Common consumer products, having packaging of known color and dimensions, placed within the image provided by the customer may provide both color references and scale references. A preview function may replicate the image provided by the customer, but indicating the new paint color, as adjusted according to an analysis of one or more color references.

Some embodiments may include a customer order system and interface, an order processing system, and a paint mixing system and dispensing system. The customer order system may include an interface that enables remote or on-site ordering, including the selection of delivery location which may be different than the ordering site. The order processing system may include an order management server that houses customer and order information and processes the information prior to sending instructions to the appropriate paint mixing system. The paint mixing and dispensing system may include a paint storage area where paint bases and colorants are stored, paint containers (including sample size, half gallon, gallon, spray can, and other paint containers), a labeling system, a completed order storage area, and an order interface where customers can order, pick up an order, view product information, and pay for an order.

Figure 1B:
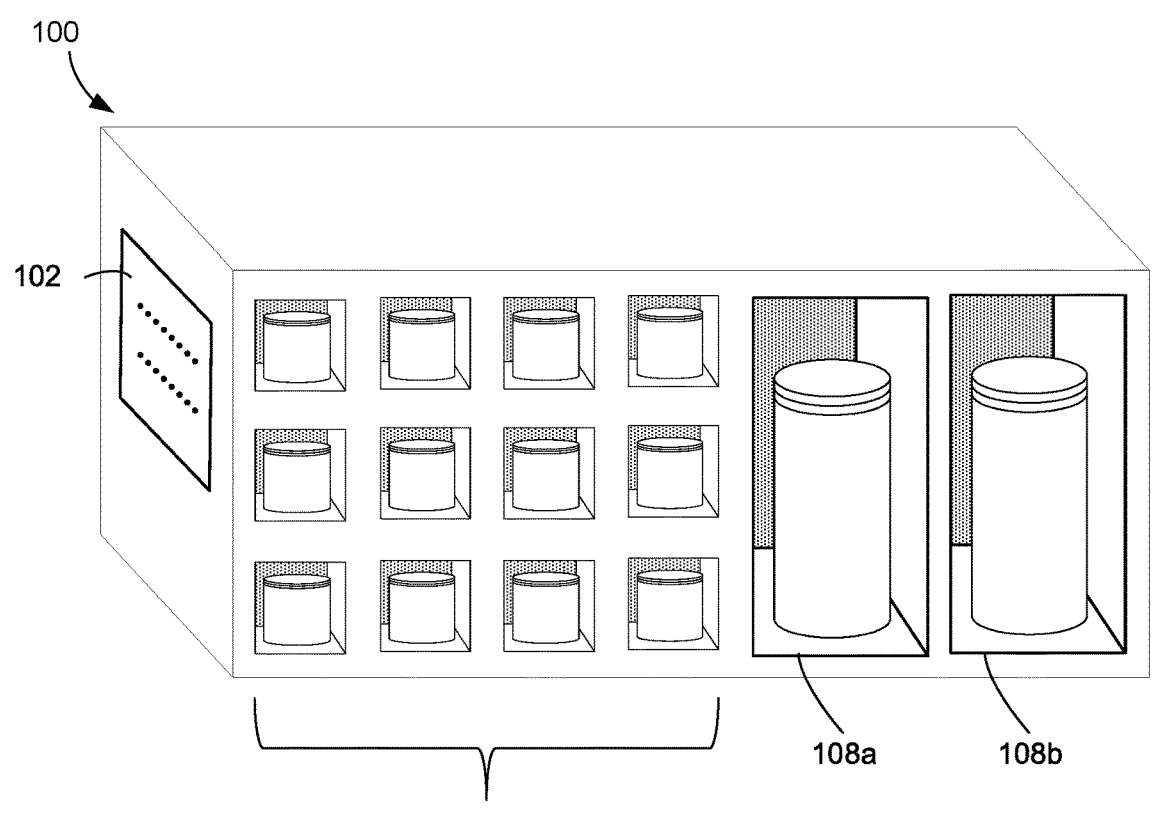
Figure 10:
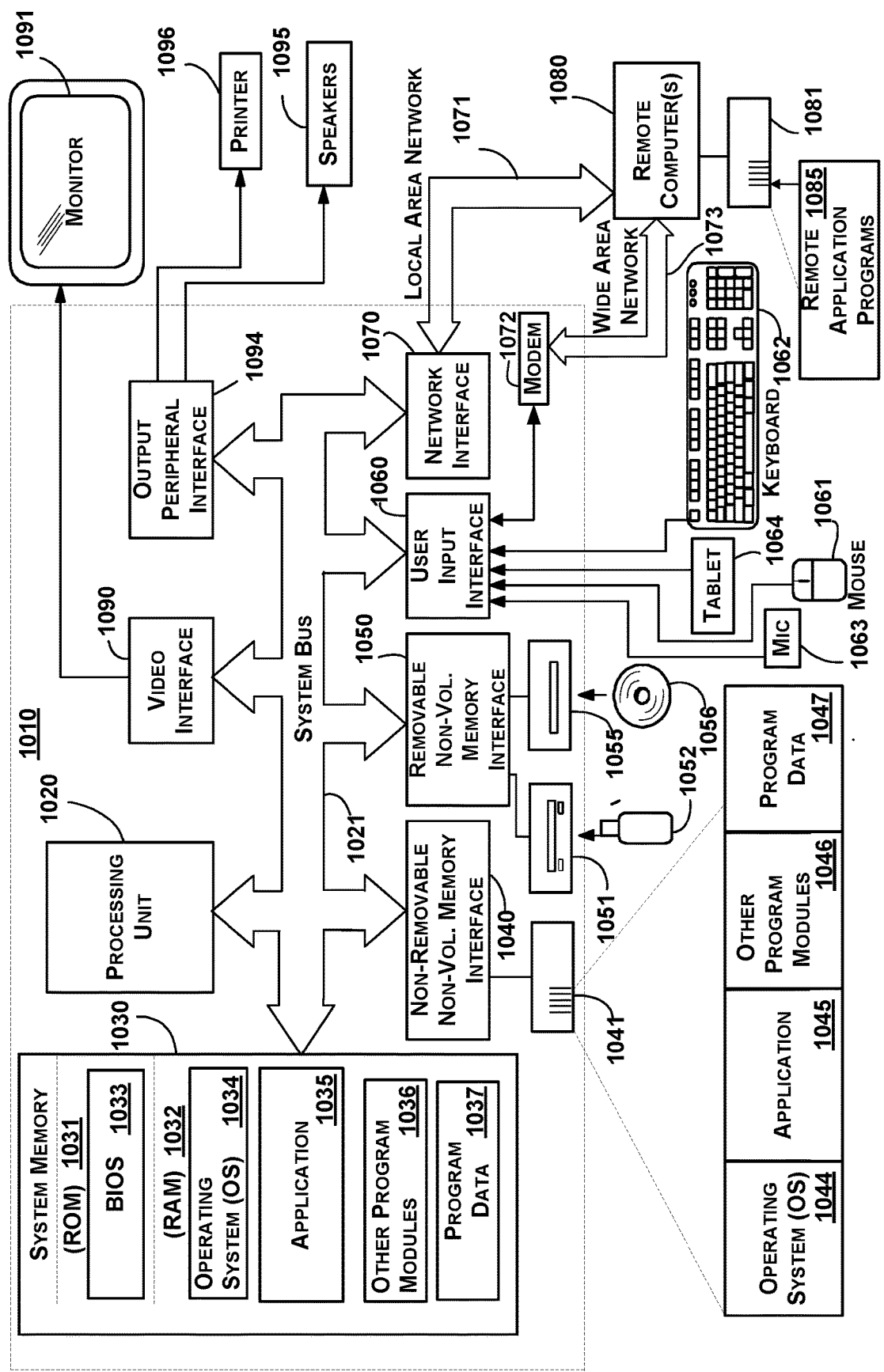
FIG. 10 is an exemplary block diagram illustrating an operating environment for a computing device that may operate or control some embodiments of an automated paint machine with custom order capability or related functionality.

FIGS. 1A and 1B illustrate an example automated paint machine 100 with custom order capability. FIG. 1A is the front view, as seen by a customer; FIG. 1B is the rear view, accessible by store staff for maintenance and resupply. In the exemplary embodiment illustrated, machine 100 includes a user interface 102 for receiving input for orders, that may include a touchscreen interface. User interface 102 may be used for both customer inputs (as will be described in reference to FIGS. 2 through 7) and administrative or maintenance actions (as will be described in reference to FIG. 8). User interface 102 and other operations of machine 100 may be controlled by a computing device as illustrated in FIG. 10. Machine 100 additionally includes a dispenser and pick-up aperture 104, visible from the front, from which customers may obtain the ordered paint, and a storage section 106 for holding paint bases and colorants. Visible from the rear are two supply holds 108a and 108b that may hold supplies, such as paint cans, lids, labels, and a label printer, for example.

When a customer attempts to enter information into user interface 102, an order wizard may pose a series of questions to guide the customer into designing a satisfactory order. These questions may include topics such as whether the surface to be painted is inside or outside; the type of room; whether there may be high heat conditions, and other topics that may be relevant to paint property requirements. Images may be shown to a customer to guide selections, as well as input from a customer's device for the purpose of making color tone and/or surface dimensional measurements. Machine 100 may determine the information needed in certain fields (such as base, color, quantity, can size, etc.), based on the customer's answers to the wizard questions, although in some embodiments, customers may be able to override some or all of the fields.

Figure 1C:
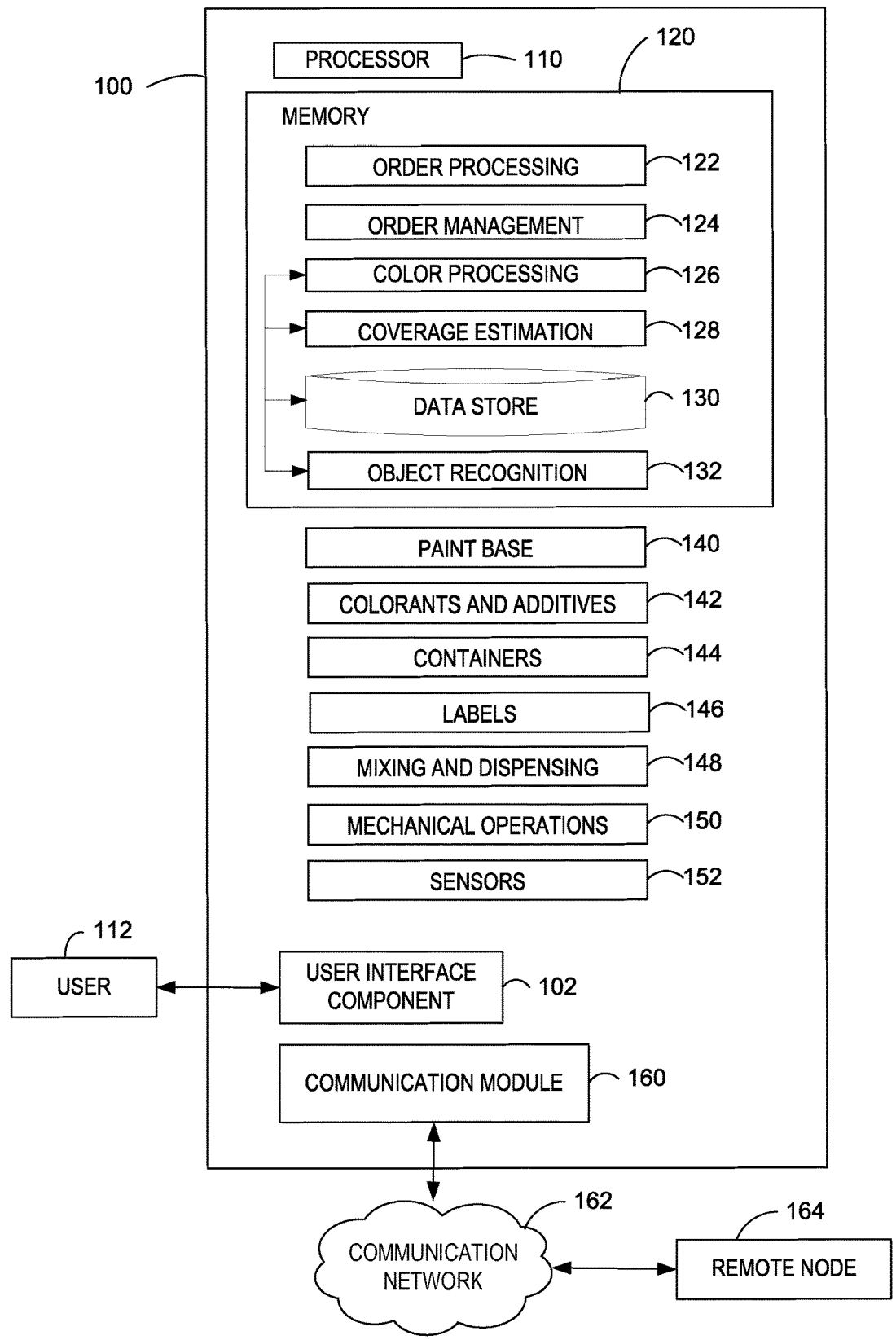

FIG. 1C illustrates a functional diagram of machine 100. Machine 100 includes a processor 110 and a memory area 120, which may be similar to corresponding portions in operating environment 1000 of FIG. 10. Memory 120 includes an order processing function 122, and order management function 124, a color processing function 126, a coverage estimation function 128, and a data store 130. Order processing function 122 operates with user interface 102 to permit a user 112 (the customer) to input information, possibly through a touchscreen or by uploading images captured on a smartphone. Order processing function 122 may also control user interface 102 to display preview images for user 112, showing the expected result of painting a surface with the currently-selected paint mixture. Order processing function 122 may also operate with a communication module 160 to send or receive orders across a communication network 162 to or from a remote node 164. Remote node 164 may be another copy of machine 100, or have additional or less functionality.

In some embodiments, order processing function 122 may also control access to pick-up aperture 104, for example to unlock a door to enable a customer to retrieve a container and may further provide a payment portal. Customer preferences, such as paint type (oil or latex), brand, sheen, color, additives (metal flakes, etc.) and container size, as well as instructions for notification upon order completion, may be received by order processing function 122, through user interface 102 and/or communication module 160. For example, a customer may initiate an order through either user interface 102 or an app that interfaces with order processing function 122 through communication module 160. A wizard may prompt a user with questions such as "What are you painting?" and other questions in order to assist in defining the order parameters, or some expert users may enter the parameters directly.

In some examples, order processing function 122 may create previews for user 112, such as displaying simulated colors on the walls of a sample photograph provided by the customer. In a graphical interface provided, slider bars (or other UI elements) may be used to adjust gloss, level of lighting, and natural light (such as curtains opened or closed and time of day). Some embodiments may accept a 3D data capture of a scene having the surfaces to be painted, and project a simulation of the selected paint onto walls with variable lighting levels. Order management function 124 may hold customer and order information and processes the information before sending it to the appropriate paint mixing system. The paint mixing system may be local (within machine 100), or remote, such as at remote node 164. Order management function 124 may also track and forward order data to assist in optimizing in-stock color selections to match demand.

Color processing function 126 may receive input color samples, and determine factors affecting differences between the received color and the true color, such as lighting conditions. For example, consider a scenario in which a customer collected a photograph of a room that was illuminated by outdoor light, perhaps bouncing off a bright green lawn and passing through a large window on a sunny day, and then submitted the image to be used for a preview. There may be a slightly green hue cast on the walls, which needs to be accounted for in determining the preview image. Or perhaps the image is submitted for the purpose of creating a paint mix that matches a color shown in some part of the image. The difference between the observed color and the true color may be analyzed by aspects of the disclosure to identify the desired paint color.

For some color processing algorithms, one or more reference colors may be useful. Some data stores may contain a large set of common product images that have packaging of consistent color and size. For example, a red soda can or a yellow box of crackers may provide useful references. If a customer places such items within the scene when the photograph is taken, then color processing function 126 can compare the known colors with the colors in the photograph, to determine any differences. To identify the specific products, the customer may also take photograph of the UPC barcodes on the packages. Color processing function 126 then may consult an object recognition function 132, which leverages product images in data store 130, to identify the specific products and retrieve images. It should be understood that data store 130 may also represent remote data storage, such as for example, on remote node 164 or at another location. Such a scheme may advantageously use the images of products in a retailer's item file database. Knowing the colors that should be observed on those products, per the item file, and comparing those known images to the captured image, provides color difference information. The color difference information may be used to modify a preview image to provide a realistic expectation of how a particular paint option may appear when applied to a wall. Some possibilities for products to use as color references include the customer's recently purchased products, from a log of purchases (such as saving catcher, or stored receipts) or the customer could use items that are available and have a barcode. Another possibility may be that the customer takes a photograph of an entire pantry full of different items, with the barcodes visible, and color processing function 126 uses object recognition 132 to identify which barcodes correspond to items having images in data store 130 and suggests using some of those items.

Coverage estimation function 128 may operate similarly with respect to reference product packages placed within a scene for a photograph. Not only may the colors be known, but sizes may also be known. For example, a soda can and a box of crackers placed adjacent to a wall may provide a scale reference (in certain image orientation scenarios) to determine the dimensions of the painting area in the image. This can be used to estimate square footage of the area requiring paint coverage. Alternatively, machine 100 may provide an actual physical scale of known size for taping to the wall to determine baseline dimensions. The scale paper may also use a library of known standard sizes and also reference colors for use with color processing function 126. The amount of paint needed may be estimated, using the surface area and the number of coats needed. For example, a new light paint over an original dark color may require more coats than a new dark paint over an original light color. Paint type and surface type may also affect the number of coats needed. Object recognition function 132 assists both color processing function 126 and coverage estimation function 128 by interpreting barcodes (or using other object recognition techniques on dollar bills or other common items having consistent sizes and colors) to identify product packaging information in data store 130.

Physical components of machine 100 include a paint base 140, a colorant and additives collection 142, container stock 144 (including lids), label stock 146, mixing and dispensing 148, and mechanical operations 150. In some embodiments, paint base 140 may use 75 to 125-gallon vessels, whereas colorants and additives 142 use 5 to 10-gallon containers for the dyes. Accent base may be eliminated, by using a large vessel for base paint. Colorants and additives 142 may include both tints and other additives, such as metal flakes. Containers 144 may include sample size, half gallon, gallon, 5-gallon, spray can, and other sizes, with various lid types (such as friction and threaded). Labels 146 includes both label stock and printing capabilities. Mixing and dispensing 148 may include hoses, pumps and nozzles for mixing base paint with colors and additives. The tanks may have paddle type agitators to keep the base color paint mixed and homogenous.

Base paints in large vessels (75-125 gallon) and colorants in small vessels (5-10 gallon), are connected by pumps, hoses and nozzles. Each nozzle port may be connected to a given vessel, for dispensing directly into a paint can. With some common current paint mixing schemes, a total of 12 colorants can mix most available color combinations. In operation, a conveyor or articulated robotic arm selects an empty vessel and transports it to a paint filling area, a tint addition area, an additive addition area, a paint can closure area, a paint mixing area, a label application area, a completed paint can QA station (where the can is examined for leaks and weighed for correct fullness, etc.), and finally along to the customer pick-up aperture 104. Sensors and cameras for vessel tracking (e.g., "Is the can present?") track fill depth and monitor base paint and colorant levels. Lids may be stacked in a cartridge, for example in supply hold 108a or 108b. An articulated arm with a suction grip may be used to retrieve a lid, which may then be affixed with a vibratory hammer or using evenly distributed points of force. In some embodiments, to avoid unwanted drips spoiling the color, the nozzles move over the vessel if and only if that particular colorant is being used. The proper amount of base paint, colorants, and additives may be measured by nozzle timing and/or weight.

Sensors 152 may include weight sensors, lasers, cameras, a light sensor, and other sensors. Weight sensors may detect correct fill level based on weight, at certain stages, based on expectations of base paint and additive weights per unit volume. Lasers may measure vessel location and alignment with dispenser nozzles. Some sensors may detect vessel tipping, spillage, or that a drip tray is full. Cameras may also identify vessel alignment and fill level, and also customer color samples. A QA light sensor may be used after a vessel is shaken or stirred (with the lid is removed), that the color was mixed properly, within tolerances. An output image of the color may be displayed for the customer to confirm that the color is correct. Incorrectly mixed paints may go to a separate holding area. If a customer is unhappy with the color, but adjustment may sometimes be possible, to be controlled via user interface 102 or the customer's own smartphone device. The options given to the customer may depend, at least partially, on the remaining space in the vessel, the colorants available, and the color already in the vessel. Machine 100 may further permit annotating the label, such as with "Kitchen walls". Some embodiments of machine 100 may allow for comparison of customer input colors to unpurchased colors on hand and may offer them the similar color on hand at a discounted rate.

Between orders, a drip collection vessel may be moved under recently-used nozzles to capture drips, and automated orders for supplies and constituent ingredients may be sent to remote node 164 when the levels are at a low threshold. As described thus far, machine 100 has multiple aspects, including ordering/processing with color compensation and coverage estimation, along with automated paint mixing and dispensing.

Figure 2:
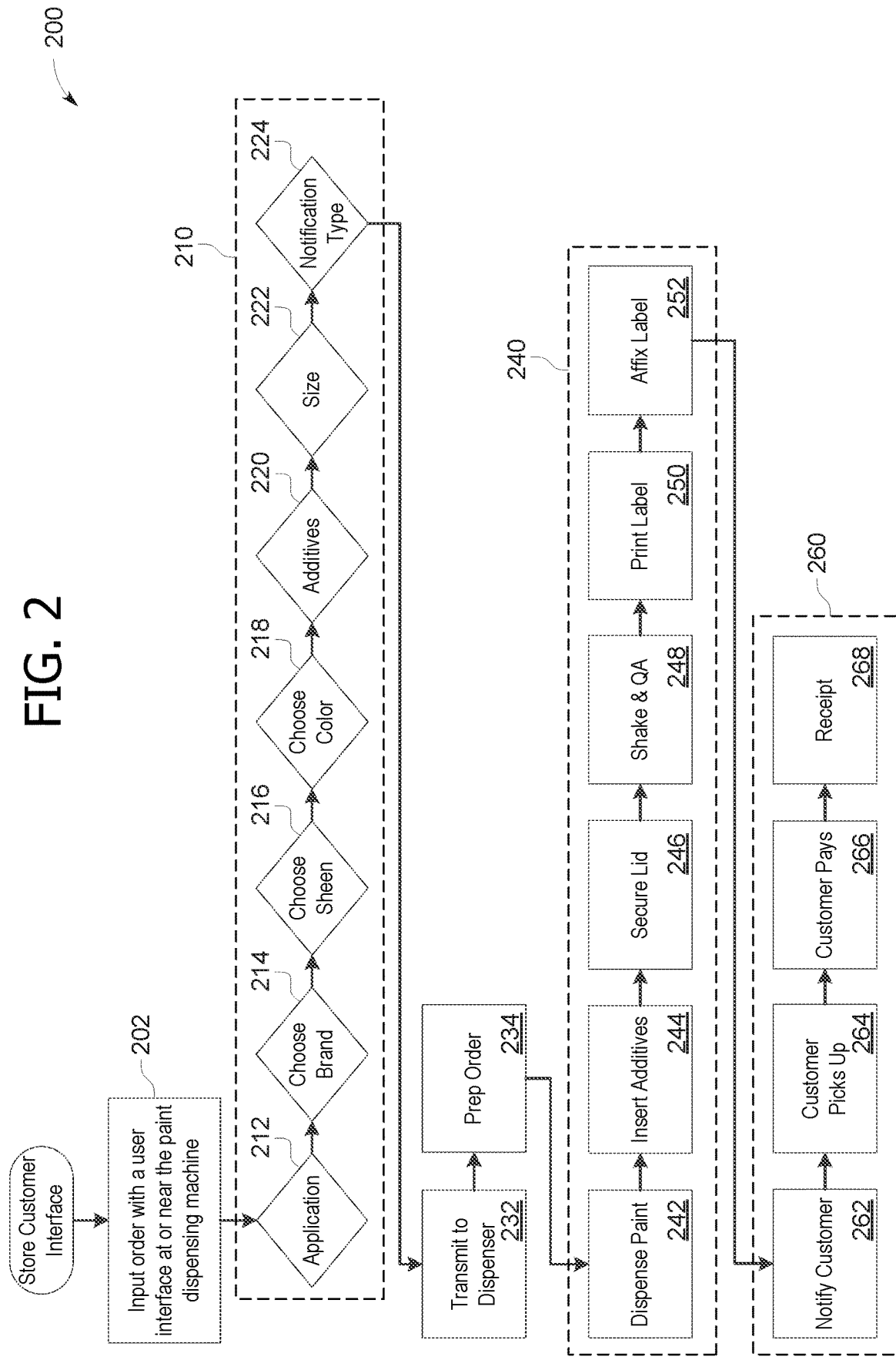
FIG. 2 is a diagram of an exemplary process flow for some embodiments of an automated paint machine with custom order capability.

FIG. 2 is a diagram of an exemplary process flow 200 for some embodiments of an automated paint machine with custom order capability. In operation, a customer at or near machine 100 enters information via user interface 102 in operation 202. User interface 102 may be on machine 100 or on a nearby kiosk. A series of questions guides the user, using a wizard to prefill data fields needed for the order, or advanced users may input specifications directly or over-ride wizard entries.

In decision operation 212, the application is determined, such as indoor or outdoor paint, and a particular brand of paint may be chosen in decision operation 214. The brand choice may be presented as price range options. The sheen (gloss, flat, satin, etc.) may be chosen in decision operation 216, and the specific color may be chosen in operation 218. These operations may include illustrative previews of various options, so that the customer can select based on visual appearance. Color choices may include a set of standard, pre-set colors that user could select (e.g., using a digital paint chip rack), or an image of a color that the customer wishes to match. Images may be furnished by a customer's smartphone, or perhaps a camera system attached to machine 100. Alternatively, a customer may provide a barcode for a product with packaging matching a desired color, or a pantone code. In some embodiments, an interface with RGB configuration controls, such as sliders for example, and other custom color creation inputs may be used. Additives for certain material applications (e.g., anti-corrosive, metallic, fire resistant, slip-resistant (silicone), etc.) may be selected in decision operation 220. The vessel size and format, such as pour-out container or aerosol spray can is selected in operation 222. The quantity of paint needed may be estimated using square footage of coverage, material, and color differences between the new paint and the original paint. A desired notification type may be selected in decision operation 224, for how the customer prefers to be notified when the paint is ready for puck up. Together decision operations 212 through 224 are a user interaction 210. It should be understood that the order of information input is merely exemplary and may be different, in different embodiments.

The information for processing the order is transmitted to the dispenser in operation 232, and the order is prepped in operation 234. This may include verifying that sufficient quantities of ingredients are available, and if not, an error or warning may be issued to alert the customer. An order fulfillment operation 240 then commences, which begins with dispensing paint 242. Then, additives are inserted 244, including colorants and other additives according to the proposed paint mixture. The lid is secured 246, and the vessel is shaken or spun and checked 248 (with a quality assurance (QA) operation). A label is printed 250 and affixed 252, and the paint may then be placed in a holding area within machine 100 until retrieval by the customer. The label may include not only color information, but also customer annotations. In a customer transaction 260, the customer is notified 262 using the method selected in decision operation 224, the customer retrieves the paint in operation 264, pays 266, and a receipt is provided in operation 268. In some embodiments, customer payment 266 (possibly using a point-of-sale (POS) function at machine 100) opens pick-up aperture 104 to permit customer retrieval 264, and so those operations may be reversed from the illustration of FIG. 2.

Figure 3:
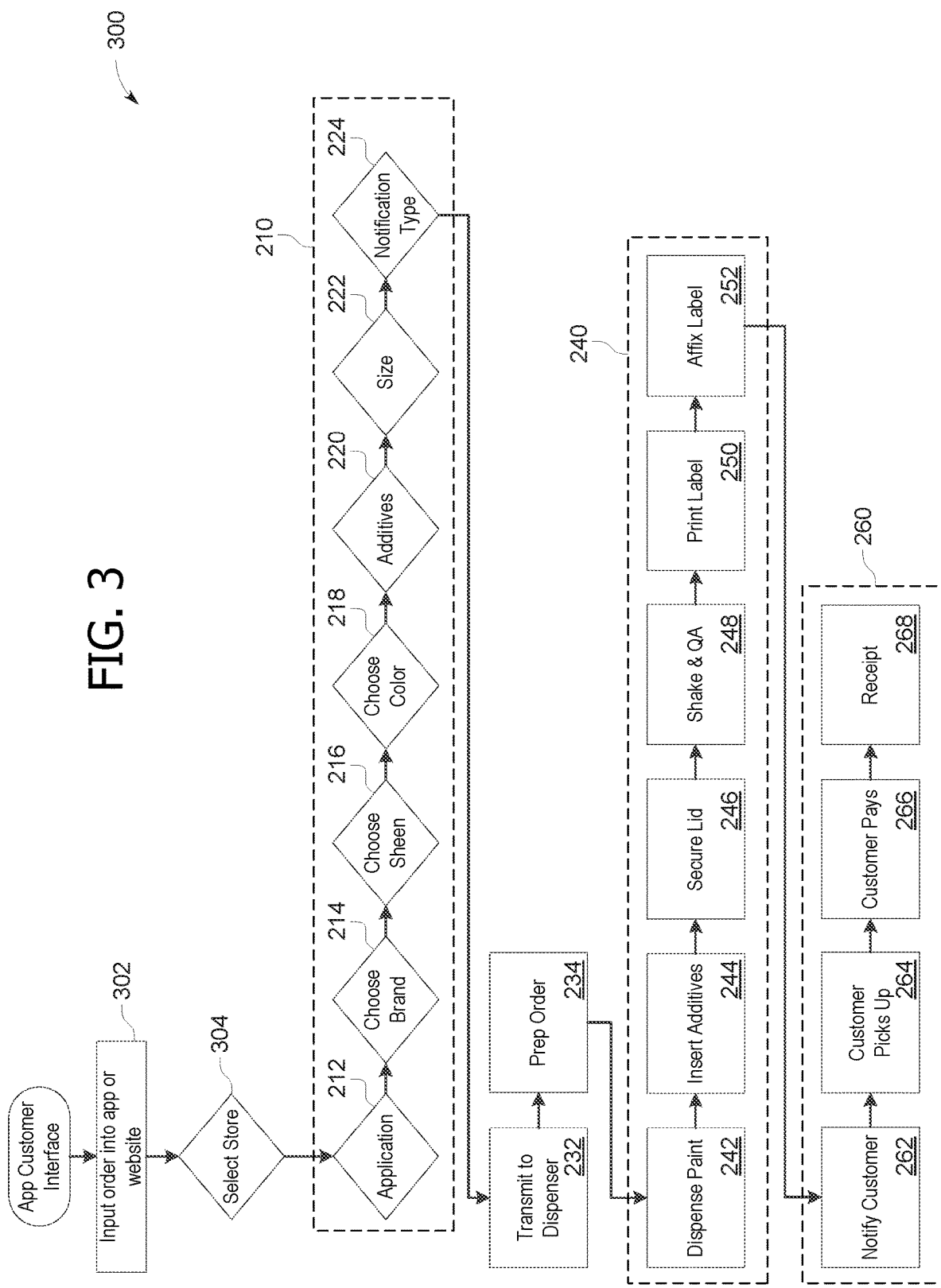
FIGS. 3 and 4 are diagrams of additional exemplary process flows for some embodiments of an automated paint machine with custom order capability.

FIG. 3 is a diagram of an additional exemplary process flow 300 for some embodiments of an automated paint machine with custom order capability. Rather than using an interface on machine 100, or a nearby kiosk, a customer may use a smartphone app or a website in operation 302. Because of the remote operation, the store to be used for pick-up is selected in operation 304. The transmission 232 to the dispenser, then includes transmission to the dispenser in the machine 100 located at the selected store.

Figure 4:
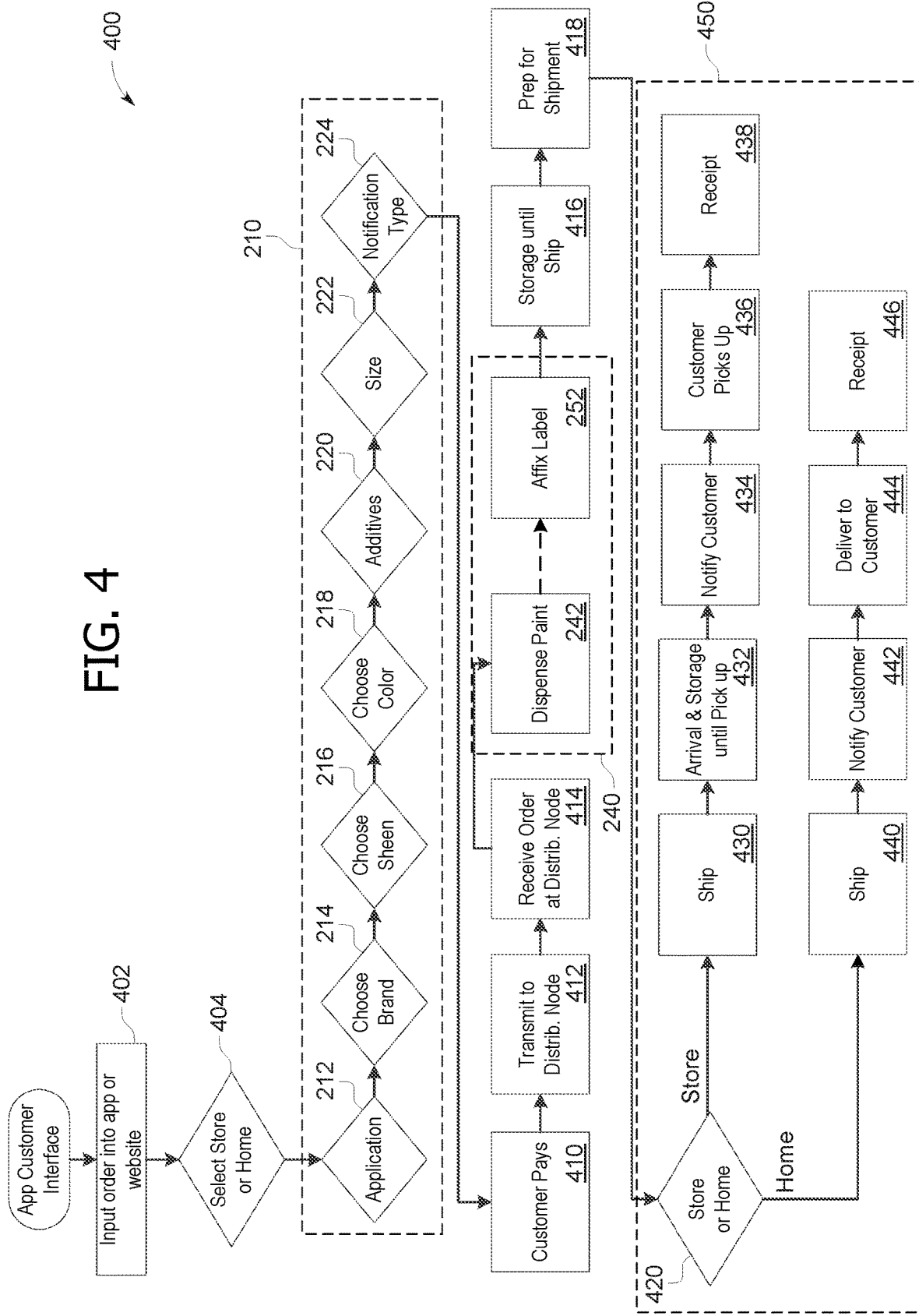

FIG. 4 is a diagram of an additional exemplary process flow 400 for some embodiments of an automated paint machine with custom order capability. Process 400 may be used when an embodiment of machine 100 is not located within a store but is instead located at some distribution node. A customer may use a smartphone app or a website in operation 402 and select either in-store pick up or home delivery in operation 404. User interaction 210 proceeds as indicated previously, and the customer pays 410. The order data is transmitted 412 to the automated paint machine with custom order capability at the distribution node and is received 414. Order fulfillment operation 240 then commences. (For clarity of FIG. 4, not all elements of order fulfillment operation 240 are shown; see FIG. 2 or 3 for a more detailed illustration.) In operation 416, the custom-mixed paint is stored, awaiting shipment.

The paint is then prepped for shipment in operation 418 and is routed either to a store or a specific delivery address in decision operation 420. For in-store pick up, the item may be shipped 430 using traditional logistics means for store deliveries. Upon arrival 432, the paint is stored awaiting the customer. The customer is notified 434, according to operation 224, and upon retrieving 436 the paint, is provided with a receipt 438. For home delivery, another shipper may be used for transport 440. The customer may be notified 442 of the expected delivery date, according to the method selected in operation 224. The paint is then delivered 444 along with a receipt 446. Together, operations 420-446, and possibly also operations 416-418, may be viewed as a delivery operation 450.

Figure 5A:
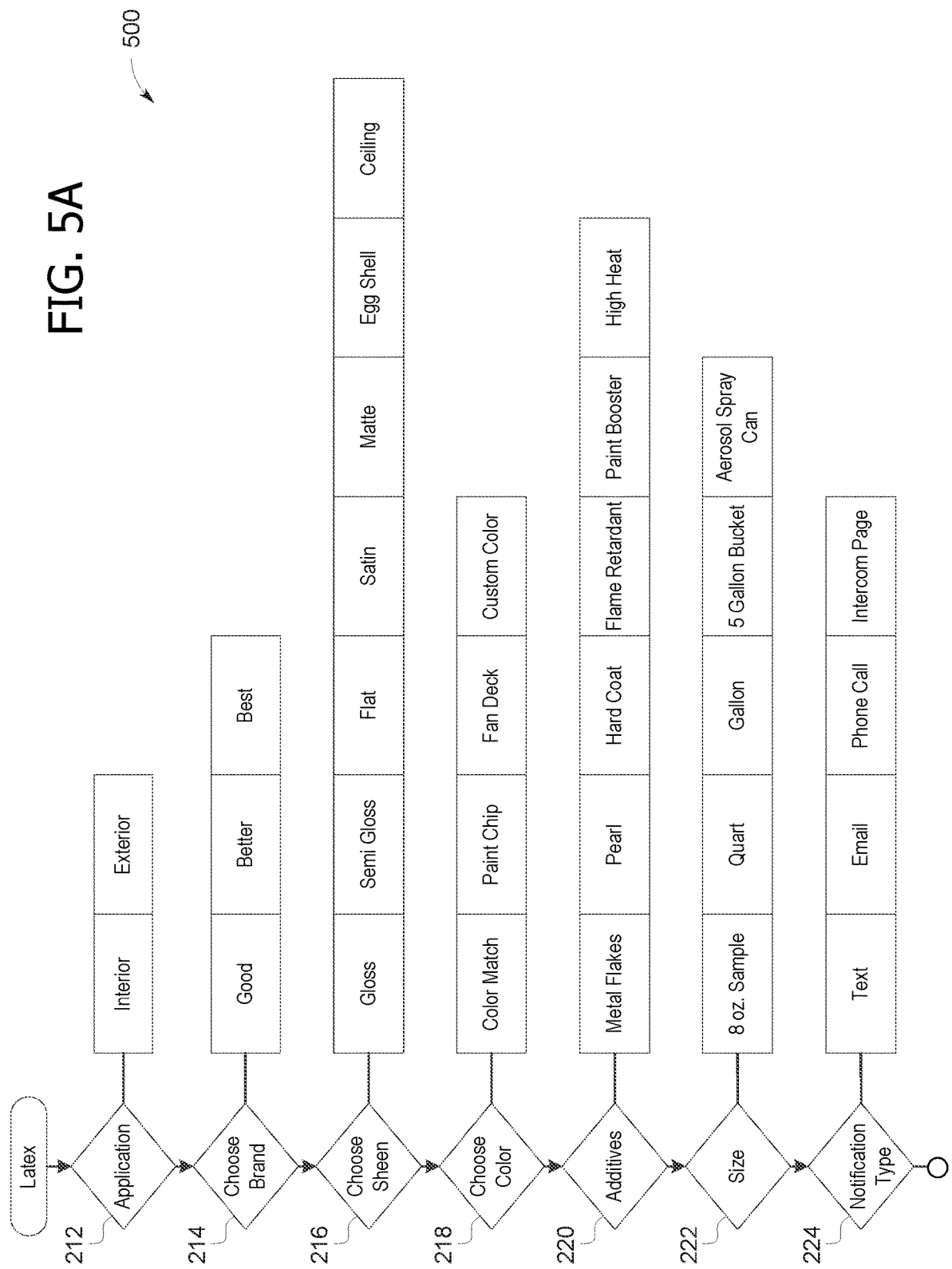
Figure 5B:
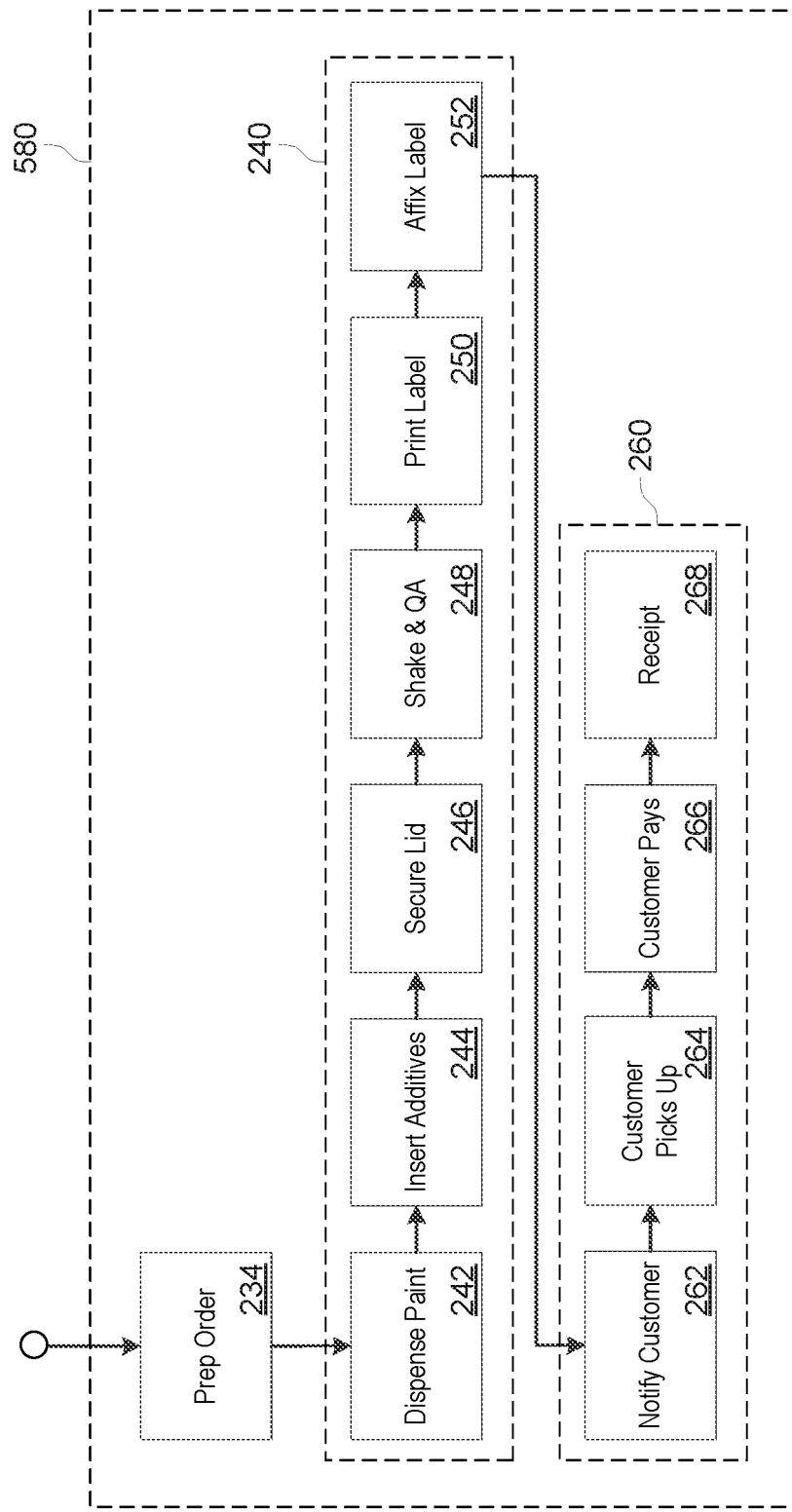

FIGS. 5A and 5B together form a diagram of an exemplary process flow 500 having additional detail related to FIGS. 2-4. Specifically, FIG. 5A illustrates some specific options available to a customer during user interaction 210 of FIGS. 2-4 if latex paint had been specified. For example, decision operation 212 indicates options interior and exterior applications, although in some embodiments, a primer may be suggested, depending on the application and surface to be painted. As illustrated, decision operation 214 indicates good, better, and best options, although specific brand names may instead be used. Sheen options in decision operation 216 are indicated as gloss, semi-gloss, flat, satin, matte, egg shell, and ceiling. Specific color choice input options are illustrated for decision operation 218. These include a color match (such as using an object having a known color), a paint chip, a fan deck, or custom color specification. In some embodiments, if a customer creates a custom color that happens to match the color formula of an existing branded paint color (e.g., Sherwin Williams™ Robin Egg blue), or scans a paint chip of a known brand, an exact color match may not be permitted. Instead, a slightly different color may then be suggested.

Specific additive options include metal flakes, pearl, hard coat, flame retardant, paint booster, and a high heat additive for decision operation 220. Other additives may assist with slip-resistance (such as silicone), and corrosion resistance; dozens of possibilities currently exist. The vessel size options for decision operation 222 are shown as 8 ounce (oz.), quart, gallon, 5-gallon, and spray can. Notification types include text (SMS), email, a phone call, and an in-store page for decision operation 224. See next FIG. 5B for a continuation. Together, prep order operation 234, order fulfillment operation 240, and customer transaction 260 may be combined into an operation 580, which will also be referenced in relation to FIG. 6.

FIG. 6 is a diagram of an exemplary process flow 600 having additional detail related to FIGS. 2-4. Specifically, FIG. 6 illustrates some specific options available to a customer during user interaction 210 of FIGS. 2-4 if oil-based paint had been specified. Due to the different paint base, some of the options are different. For example, there may not be a need to specify interior or exterior grade, and ceiling may not be an option for the sheen selection. Process flow 600 also includes operation 580, as illustrated in FIG. 5B.

Figure 7:
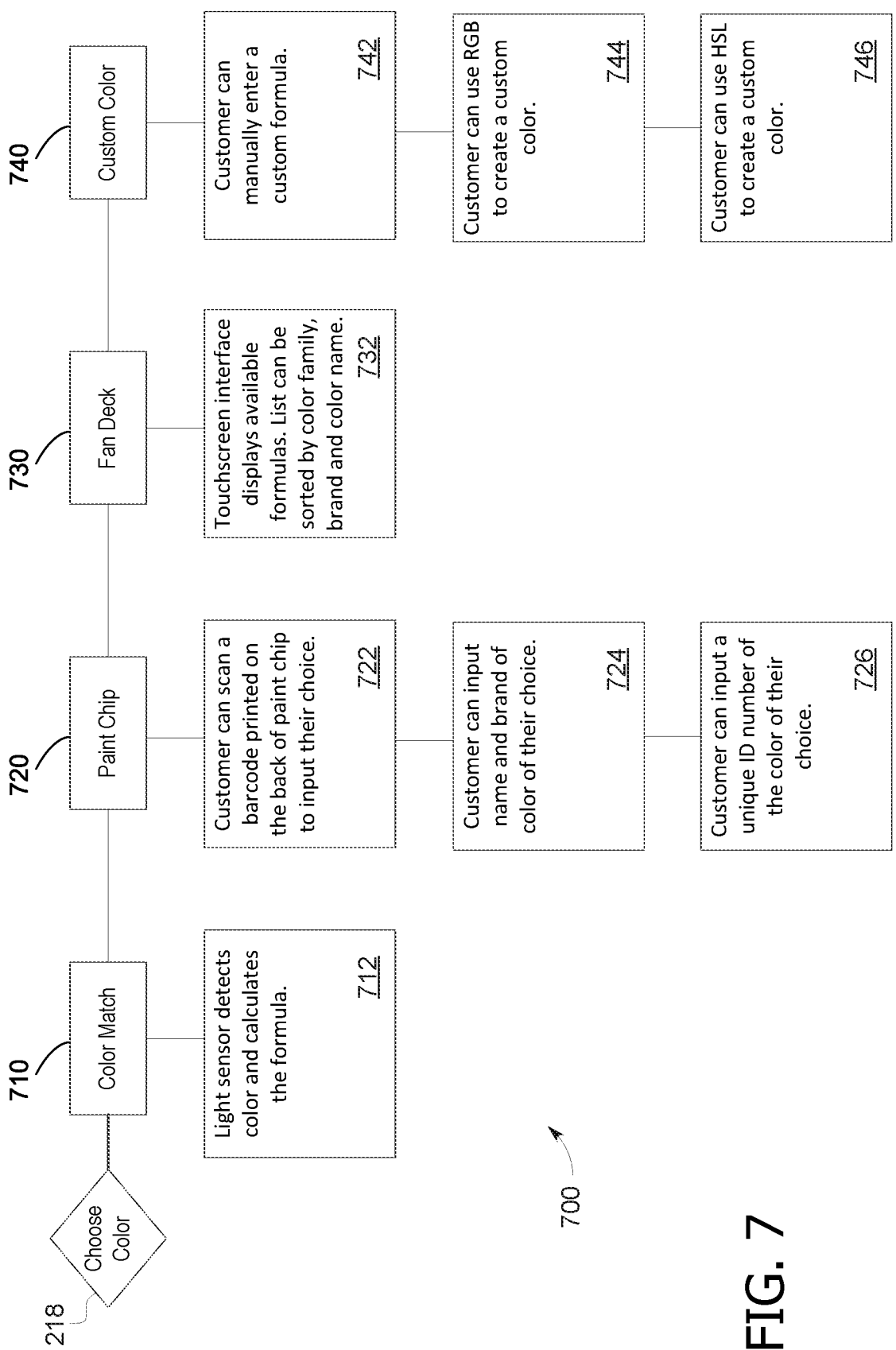
FIG. 7 is a diagram of an exemplary process flow having additional detail related to FIGS. 5A and 6.

FIG. 7 is a diagram of an exemplary process flow 700 having additional detail related to FIGS. 5A and 6. For example, color match 710 uses a light sensor at operation 712, such as one of sensors 152 (see FIG. 1C), to detect color and calculate a formula. Paint chip option at operation 720 permits three different input options, as illustrated. A customer can scan a barcode printed on the back of a paint chip at operation 722, using either the customer's own smartphone camera, or one of sensors 152. A customer can input the name and brand of their choice at operation 724, or a customer can input a unique reference number, such as a pantone code, at operation 726. For fan deck at operation 730, a customer may use a touchscreen to select from a list, perhaps using user interface 102, at operation 732. For a custom color at operation 740, there are three options illustrated. A customer can manually enter a formula at operation 742, or RGB values at operation 744, or HSL (hue, saturation, luminosity) values at operation 746.

Figure 8:
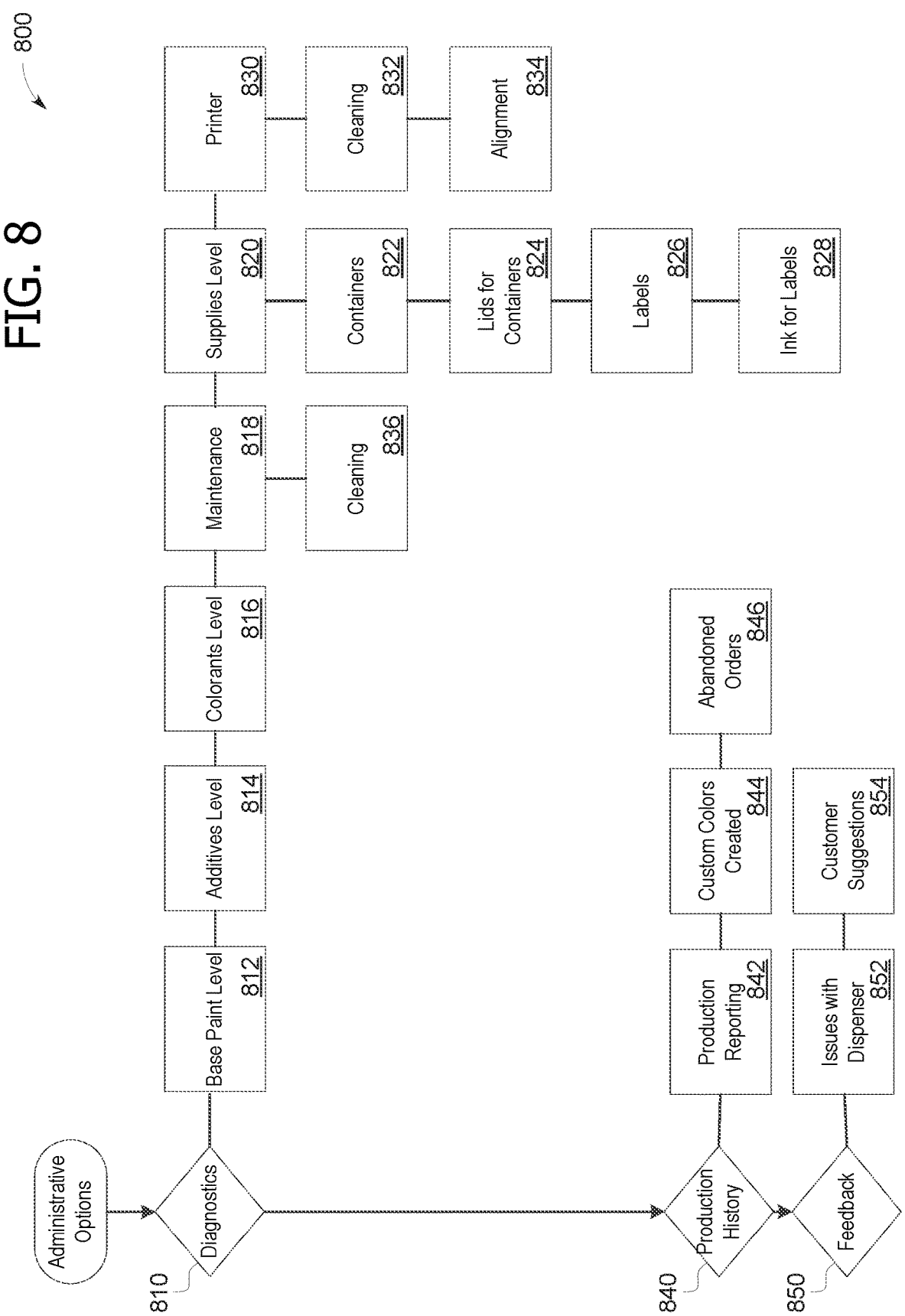
FIG. 8 is a diagram of an additional exemplary process flow for some embodiments of an automated paint machine with custom order capability.

FIG. 8 is a diagram of an additional exemplary process flow 800 for some embodiments of an automated paint machine with custom order capability. Specifically, process flow 800 indicates an administrative menu for when a user of machine 100 is not a customer, but instead may be a maintenance worker. A diagnostics decision at operation 810 indicates multiple options. These include: checking base paint levels at operation 812, checking additives levels at operation 814, checking colorant levels at operation 816, and maintenance at operation 818, such as cleaning at operation 836. Another illustrated option is checking supplies levels at operation 820, with specific supply levels indicated as containers 822, lids 824, labels 826 and label ink 828. Another illustrated option is label printer maintenance at operation 830 including cleaning 832 and alignment 834. Moving further down process flow 800, a user may check production history at operation 840, such as by reporting at operation 842 on production, identifying custom colors created by customers at operation 844, and checking abandoned orders at operation 846. Additionally, customer feedback may be investigated at operation 850, such as dispenser issues 852 and customer suggestions 854.

Figure 9:
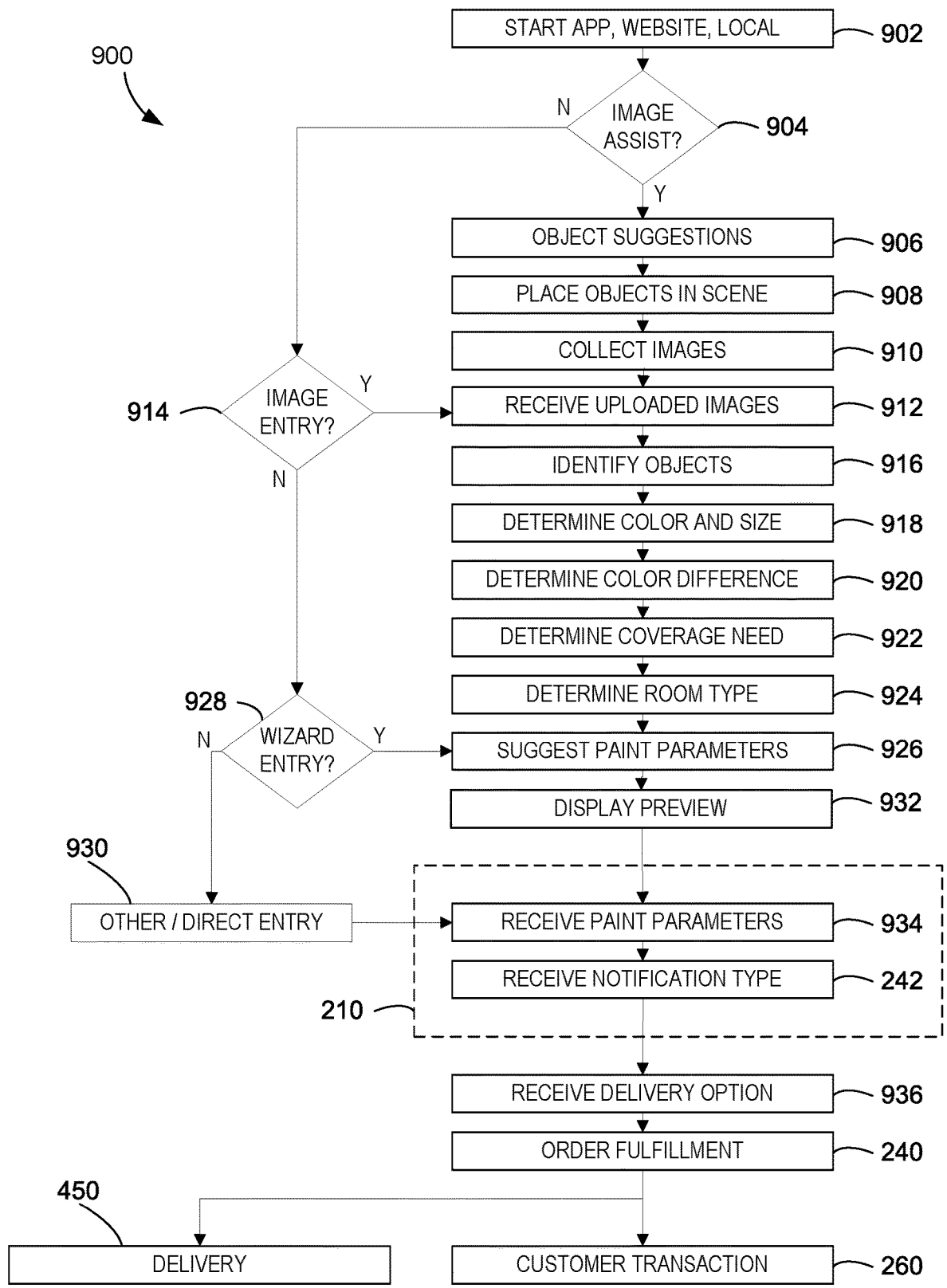
FIG. 9 is a diagram of an exemplary process flow for operating some embodiments of an automated paint machine with custom order capability.

FIG. 9 is a diagram of an exemplary process 900 for operating some embodiments of an automated paint machine with custom order capability. When a customer starts a project, they start at operation 902 an app on their device (smartphone, tablet, PC), on a website, on a kiosk near the machine, or on the user interface at the machine. If the customer wishes use a photograph which includes the walls, ceiling, or other surfaces to be painted at operation 912, and also wishes to use reference objects in that photograph for more accurate color rendition, then they may select image assistance at operation 904. Proceeding with the image assistance operation, reference object suggestions at operation 906 are provided that may enable more precise scale and color measurements at operations 920 and 922. That is, the app, website or other user interface guides the customer through selecting known products for placing in the room to be painted. The suggestions may be based on products the customer already possesses, along with the existing paint color, dominant colors in the scene, and approximate dimensions of the scene that will be in the photograph. The objects may be common objects, such as a dollar bill, or a printout on a piece of paper having a known size (possibly provided by the machine itself), or a product packaged with a well-controlled color scheme and size. For example, the customer may have a particular brand of soda can with red or blue colors, and a yellow box of crackers in the pantry. The customer may take a photograph of the pantry, possibly with the products' UPC barcodes visible, and receive a recommendation from which products in the pantry would work the best. Alternatively, the recommendation may include products that the customer may not have, and possibly include coupons for those products. The customer then places the indicated objects in the scene at operation 908 and collects images (takes photographs) at operation 910. The images may be two dimensional (2D) or three dimensional (3D).

The customer's uploaded images are received at operation 912, possibly using an app, a website, or a communication interface at the paint mixing machine. If, in decision operation 904, the customer had not selected image assistance, but had just taken photographs of the scene (with or without objects), but the customer does select image entry at operation 914 for the paint selection assistance, then the customer enters operation 912 through that alternative path. Reference objects are identified at operation 916 in the image, using barcodes or other object recognition techniques, if there are any in the images. See the description of object recognition function 132 in relation to FIG. 1. The reference objects' true colors and sizes are determined at operation 918, and the difference between the true color of a reference object and the object's observed color in the image is used to determine the color difference at operation 920. This is a color tint that can be caused by lighting conditions, such as, for example, the use of soft white versus bright white lightbulbs, or natural daylight with a significant reflection from a colored surface. If the color difference cannot be determined reliably, or provides anomalous results, the customer may be prompted to try taking another photograph with different reference objects or lighting conditions.

Coverage need for the proposed paint mixture is determined at operation 922, for example by using the known size of the reference objects and their size relative to a wall that is to be painted, in order to determine the scale of the image Coverage need will be based, at least in part, by the area measurement of the surface to be painted. 2D, 3D or 360-degree images may be used, in various embodiments to calculate square footage to paint. The use of multiple objects, at opposing edges of the image, can assist in ascertaining whether the wall to be painted is imaged straight on, or at a skewed angle. Coverage need, along with the recommendation of a primer, can also be influenced by whether a light color is being painted over top of a dark color, or the reverse. The type of surface, such as brick or bare wood, which tend to be absorbent, can also affect coverage need. This is used to make recommendations on the quantity of paint needed.

Optionally, the type of room may be determined at operation 924, possibly using object recognition on furniture items such as couches and dressers, or appliances such as dryers and refrigerators. This may lead to suggestions and coupons for other items that may be common in those rooms, such as rugs or furniture, which may be color coordinated with the paint that will be selected. Detection of different rooms may result in recommendations of semi-floss or flat, or some other sheen. Operation 924 may also identify whether the painting surface is outdoors, which may result in a recommendation for an oil-based paint or an exterior-grade latex. Parameters for a proposed paint mixture are suggested at operation 926, using information collected thus far. Some paint parameter options are illustrated in FIGS. 5A-7 and include: application, brand, sheen, color, additives, and quantity. One possible example may include that operation 924 determined that the room to be painted was a laundry room, based on the presence of a dryer, so a latex semi-gloss white paint is suggested, along with a white dryer. There may be themed presets, such as "farmhouse" or "contemporary urban" that each has a set of coordinated suggestions for color combinations. Images may be provided to illustrate for the customer how different sheen and additive choices may appear in representative settings.

Paint parameter suggestions may also be generated by a wizard interface during operation 926. The wizard may not require the use of an input image. So, if in decision operation 914, the customer had not selected to use an image entry for color selection assistance, the customer may be presented with an option in decision operation 928 to enter operation 926 and use the wizard at that time. The wizard may ask about the base condition of the material being painted, which could result in a recommendation for a primer or a larger quantity of paint. The wizard may prefill information fields used in a later operation 934, although some or all of the fields may be overridden by the customer. If, however, the customer did not wish to use the wizard, and instead preferred to use a paint chip, pantone code, or a manual formula entry, the customer could select other/direct entry 930 and enter later operation 934.

However, if using the wizard, then prior to finalizing selections, operation 932 displays (provides) a preview of a finished project using the proposed paint mixture. This preview can use a color correction or adjustment based on the results of operation 920 that determined the color difference, in order to provide a realistic expectation of the finished result in real-world lighting conditions. The customer's uploaded image may be used as a basis to preview the finished project, by replacing the color shown on a particular will with a currently-selected color. In some embodiments, the customer may toggle different color and sheen possibilities, and alter various simulated lighting conditions until a favorite paint is identified.

The selected paint parameters are received at operation 934. The customer makes the final selections on application, brand, sheen, color, additives, and quantity/size. For example, a sensor may scan an item for a color match, or a customer may specify that they desire the same color as on some product (perhaps looking up the product in a menu or entering its UPC barcode), and then adjusting the color to preference. Custom RGB or HSL inputs may be used. See, for example, the options shown in FIGS. 5A-7. Order information may be stored (for example, using order management function 124 of FIG. 1) for use by the customer to order touch-up paint at a later time. Additionally, if several different customers are ordering the same color, the retailer may wish to begin carrying that color in stock. In operation 242, the customer notification preferences are received. Together, operations 934 and 242 form user interaction 210 of FIGS. 2-4. Customer delivery option preferences are received in operation 936, specifying in-store pick up or home delivery, unless the user is local to the machine that will be mixing the paint. The paint is actually mixed in order fulfillment operation 240 and provided to the customer in either customer transaction 260 or delivery operation 450.

Exemplary Operating Environment

FIG. 10 is an exemplary block diagram illustrating an operating environment 1000 for a computing device that may operate or control some embodiments of an automated paint machine with custom order capability or related functionality. The operating environment 1000 is only one example of a suitable computing environment and is not intended to suggest any limitation as to the scope of use or functionality of the disclosure. Neither should the operating environment 1000 be interpreted as having any dependency or requirement relating to any one or combination of components illustrated in the exemplary operating environment 1000. The disclosure is operational with numerous other general purpose or special purpose computing system environments or configurations. Examples of well-known computing systems, environments, and/or configurations that may be suitable for use with the disclosure include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 10, an exemplary system for implementing various aspects of the disclosure may include a general-purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media may be any available media that may be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 1030 is an example of non-transitory computer-readable storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by the computer 1010. Computer storage media does not, however, include propagated signals. Rather, computer storage media excludes propagated signals. Any such computer storage media may be part of computer 1010.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 1030 includes computer storage media in the form of volatile and/or nonvolatile memory such as read only memory (ROM) 1031 and random-access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs, such as an application 1035 that may perform operations described herein, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a universal serial bus (USB) port 1051 that provides for reads from or writes to a removable, nonvolatile memory 1052, and an optical disk drive 1055 that reads from or writes to a removable, non-volatile optical disk 1056 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and USB port 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, an application 1045 that may perform operations described herein, other program modules 1046 and program data 1047. Note that these components may either be the same as or different from operating system 1034, application 1035, other program modules 1036, and program data 1037. Operating system 1044, application 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel may be physically coupled to a housing in which the computer 1010 is incorporated, such as in a tablet-type personal computer. In addition, computers such as the computer 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073 but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

Exemplary Operating Methods and Systems

Embodiments of a vending system are disclosed for delivering custom paints, permitting automated paint mixing and dispensing without the need for assistance. Customizable paint may be ordered locally or remotely, possibly with improved color matching that leverages color references to compare a known color with a color as observed within an image provided by the customer. Dimensional estimates of the surface to be painted may be possible using scale references within an image provided by the customer, to provide quantity suggestions. Common consumer products, having packaging of known color and dimensions, placed within the image provided by the customer may provide both color references and scale references. A preview function may replicate the image provided by the customer, but indicating the new paint color, as adjusted according to an analysis of one or more color references.

An exemplary system for automated paint dispensing, implemented on at least one processor, comprises: a processor; and a non-transitory computer-readable medium storing instructions that are operative when executed by the processor to: receive an image of a scene comprising a reference object; identify the reference object; determine a true color of the reference object; determine a color difference between an observed color of the reference object and the true color of the reference object; provide a preview of a finished project using a proposed paint mixture, the preview using a color adjustment based on the determined color difference; and dispense paint with additives included according to the proposed paint mixture.

An exemplary method for automated paint dispensing, implemented on at least one processor, comprises: receiving an image of a scene comprising a reference object; identifying the reference object; determining a true color of the reference object; determining a color difference between an observed color of the reference object and the true color of the reference object; providing a preview of a finished project using a proposed paint mixture, the preview using a color adjustment based on the determined color difference; and dispensing paint with additives included according to the proposed paint mixture.

One or more exemplary computer storage devices having a first computer-executable instructions stored thereon for automated paint dispensing, which, on execution by a computer, causes the computer to perform operations comprising: receiving an image of a scene comprising a reference object; identifying the reference object; determining a true color of the reference object; determining a color difference between an observed color of the reference object and the true color of the reference object; providing a preview of a finished project using a proposed paint mixture, the preview using a color adjustment based on the determined color difference; and dispensing paint with additives included according to the proposed paint mixture.

A system for automated paint dispensing with custom order capability implemented on at least one processor may comprise: a processor; and a non-transitory computer-readable medium storing instructions that are operative when executed by the processor, the instructions comprising logic for implementing any of the methods or processes disclosed herein.

Alternatively, or in addition to the other examples described herein, examples include any combination of the following:

providing a suggestion of the reference object;

determining a coverage need for the proposed paint mixture using an area measurement of the surface to be painted;

suggesting parameters for the proposed paint mixture;

using a wizard to generate the suggested paint parameters;

receiving delivery or notification preferences; and the suggested paint parameters include one or more parameters selected from the list consisting of: application, brand, sheen, color, additives, and quantity.

The examples illustrated and described herein as well as examples not specifically described herein but within the scope of aspects of the disclosure constitute an exemplary entity-specific value optimization environment. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for automated paint dispensing, implemented on at least one processor, the system comprising:
   a processor; and
   a non-transitory computer-readable medium storing instructions that are operative when executed by the processor to:
      receive an image of a scene comprising a reference object;
      identify the reference object;
      determine a true color of the reference object;
      determine a color difference between an observed color of the reference object and the true color of the reference object;
      provide a preview of a finished project using a proposed paint mixture, the preview using a color adjustment based on the determined color difference; and
      dispense paint with additives included according to the proposed paint mixture.

2. The system of claim 1 wherein the instructions are further operative to:
   provide a suggestion of the reference object.

3. The system of claim 1 wherein the instructions are further operative to:
   determine a coverage need for the proposed paint mixture using an area measurement of a surface to be painted.

4. The system of claim 1 wherein the instructions are further operative to:
   suggesting parameters for the proposed paint mixture.

5. The system of claim 4 wherein the instructions are further operative to:
   use a wizard to generate the suggested paint parameters.

6. The system of claim 5 wherein the suggested paint parameters include one or more parameters selected from a list consisting of:
   application, brand, sheen, color, additives, and quantity.

7. The system of claim 1 wherein the instructions are further operative to:
   receive delivery or notification preferences.

8. A method for automated paint dispensing, implemented on at least one processor, the method comprising:
   receiving an image of a scene comprising a reference object;
   identifying the reference object;
   determining a true color of the reference object;
   determining a color difference between an observed color of the reference object and the true color of the reference object;
   providing a preview of a finished project using a proposed paint mixture, the preview using a color adjustment based on the determined color difference; and
   dispensing paint with additives included according to the proposed paint mixture.

9. The method of claim 8 further comprising:
   providing a suggestion of the reference object.

10. The method of claim 8 further comprising:
    determining a coverage need for the proposed paint mixture using an area measurement of a surface to be painted.

11. The method of claim 8 further comprising:
    suggesting parameters for the proposed paint mixture.

12. The method of claim 11 further comprising:
    using a wizard to generate the suggested paint parameters.

13. The method of claim 12 wherein the suggested paint parameters include one or more parameters selected from a list consisting of:
    application, brand, sheen, color, additives, and quantity.

14. The method of claim 8 further comprising:
    receiving delivery or notification preferences.

15. One or more computer storage devices having a first computer-executable instructions stored thereon for automated paint dispensing, which, on execution by a computer, cause the computer to perform operations comprising:
    receiving an image of a scene comprising a reference object;
    identifying the reference object;
    determining a true color of the reference object;
    determining a color difference between an observed color of the reference object and the true color of the reference object;
    providing a preview of a finished project using a proposed paint mixture, the preview using a color adjustment based on the determined color difference; and
    dispensing paint with additives included according to the proposed paint mixture.

16. The one or more computer storage devices of claim 15 wherein the operations further comprise:
    providing a suggestion of the reference object.

17. The one or more computer storage devices of claim 15 wherein the operations further comprise:
    determining a coverage need for the proposed paint mixture using an area measurement of a surface to be painted.

18. The one or more computer storage devices of claim 15 wherein the operations further comprise:
    suggesting parameters for the proposed paint mixture.

19. The one or more computer storage devices of claim 18 wherein the operations further comprise:
    using a wizard to generate the suggested paint parameters.

20. The one or more computer storage devices of claim 19 wherein the suggested paint parameters include one or more parameters selected from a list consisting of:
    application, brand, sheen, color, additives, and quantity.

* * * * *